F. C. STOFFER.
STEERING MECHANISM FOR AUTOMOBILES.
APPLICATION FILED MAY 21, 1921.
1,408,841.
Patented Mar. 7, 1922.
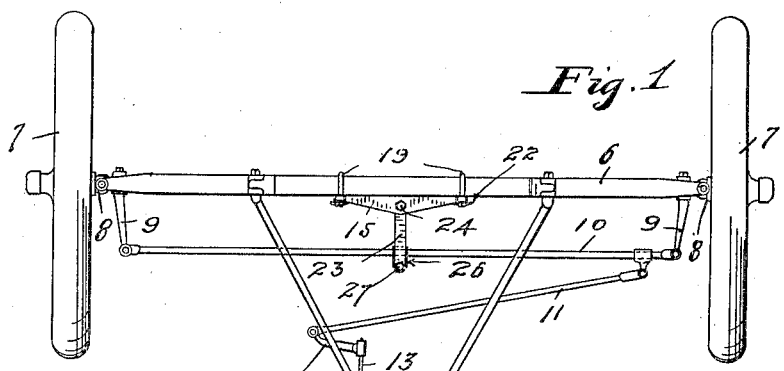
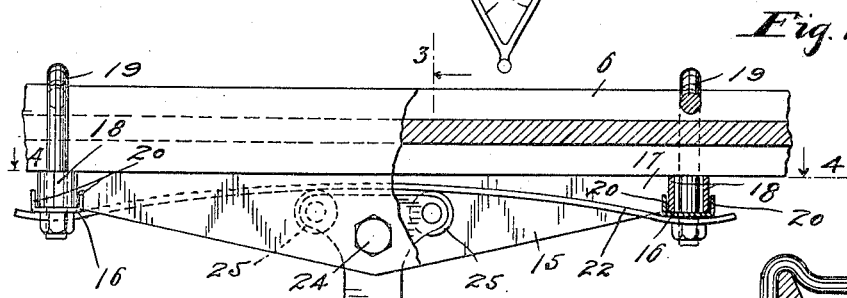
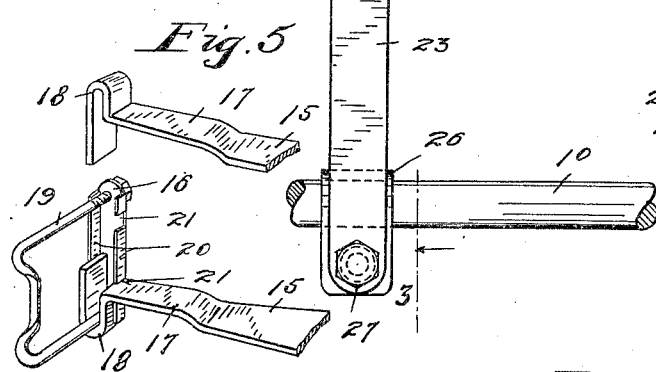
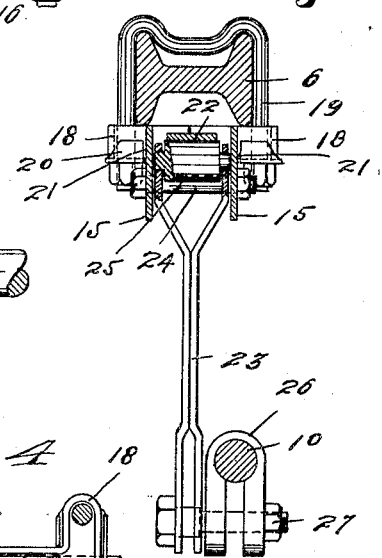
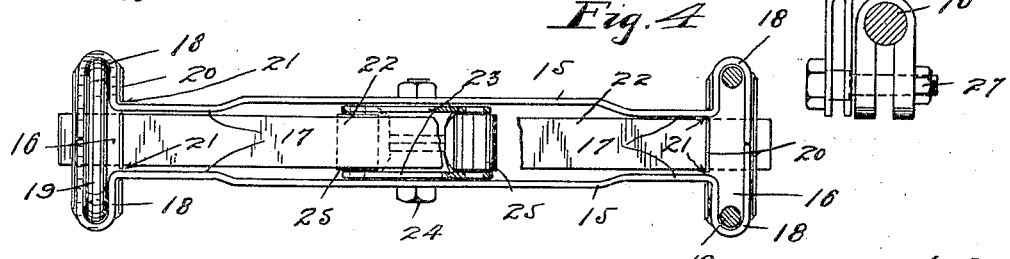
Inventor
Frank C. Stoffer
By his Attorneys

UNITED STATES PATENT OFFICE.

FRANK C. STOFFER, OF MINNEAPOLIS, MINNESOTA.

STEERING MECHANISM FOR AUTOMOBILES.

1,408,841.  Specification of Letters Patent.  Patented Mar. 7, 1922.

Application filed May 21, 1921. Serial No. 471,318.

*To all whom it may concern:*

Be it known that I, FRANK C. STOFFER, am a citizen of the United States, residing at Minneapolis, in the county of Hennepin and State of Minnesota, have invented certain new and useful Improvements in Steering Mechanism for Automobiles; and I do hereby declare the following to be a full, clear, and exact description of the invention, such as will enable others skilled in the art to which it appertains to make and use the same.

My present invention relates to steering mechanism for automobiles, and more particularly, to a stabilizer therefor, of the type disclosed and broadly claimed in the Stoffer and Yost U. S. Letters Patent, #1,355,517, issued October 12, 1920, and has for its object to increase the efficiency of the same and facilitate the manufacture and assembly thereof.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 1 is a plan view of the improved stabilizer applied to the front axle and steering connection for the front wheels of a Ford automobile;

Fig. 2 is a fragmentary enlarged view of the front axle steering connection and a stabilizer, as shown in Fig. 1, with some parts broken away and sectioned;

Fig. 3 is a view principally in vertical section taken on the line 3—3 of Fig. 2;

Fig. 4 is a front elevation of the stabilizer, with some parts sectioned on the line 4—4 of Fig. 2; and Fig. 5 is a fragmentary perspective view of the frame and one of the clamping yokes, with one of the frame side bars separated from the other parts thereof.

In the drawings, the following parts of the regular Ford equipment are shown, to-wit: front axle 6, front wheels 7, journaled on stub axles 8 pivoted to said axle and having arms 9 connected by a cross-rod 10, connecting rod 11, one end of which is attached to said cross-rod and the other end of which is attached to an arm 12 on the lower end of the steering post shaft 13, and radius rods 14.

The improved stabilizer includes a frame made up of a pair of vertically spaced upper and lower side bars 15 connected by transverse tie or end bars 16. The side bars 15 are duplicates and are stamped and pressed from flat pieces of metal. Near the ends of the frame side bars 15, the same are laterally offset toward each other to afford spring guides 17. Outward of the spring guides 17, the bars 15 are bent outward to afford transversely arranged U-shaped members 18, the outer or free arms of which are somewhat longer than the other arms thereof, and abut to hold the side bars 15 properly spaced.

The end bars 16 are also duplicates and are pressed and stamped from sheet metal and have, at their ends, perforations through which project the prongs of nut-equipped yokes 19 adapted to embrace the front axle 6 and detachably connect the stabilizer thereto. On the longitudinal edges of the end bars 16 are retaining flanges 20 arranged to receive therebetween, the U-shaped members 18 of the side bars 15 to lock said side bars to the end bars against longitudinal movement in respect thereto, as best shown in Fig. 5. The two opposing retaining flanges 20 are notched at 21 to receive the side bars 15 and thereby further lock the side bars 15 and end bars 16 together against transverse movement in respect to the side bars 15 and also hold the outer arms of the U-shaped members 18 in abutting arrangement in respect to the side bars 15. When the side bars 15 are interlocked with the side bars 16, the U-shaped members 18 embrace the prongs of the yokes 19, as best shown in Figs. 4 and 5. It will be noted that the U-shaped members 18 engage the out-turned flanges of the axle 6 as bearings for the stabilizer and the yoke 19 clamp the same thereon.

A leaf spring 22 extends between the frame side bars 15 with its ends bearing on the frame end bars 16 and said spring is held against edgewise movement between the frame side bars 15 by the spring guides 17 thereof. Co-operating with the leaf spring 22 is a centering lever 23, the front end of which has a head which extends between the frame side bars 15 and is pivoted thereto by a nut-equipped bolt 24 mounted in aligned bores in said bars. This head of the lever 23, forward of its pivot 24, has on each side of said pivot, a forwardly extending bearing surface or point that directly engages the intermediate portion of the leaf spring 22, and preferably, as shown, these bearing surfaces are afforded by small rollers 25 journaled to said lever.

The rear end of the centering lever 23 is pivotally connected to the cross-rod 10 of the steering mechanism by a split clamp 26 through the prongs of which extends a nut-equipped bolt 27, and said prongs are engaged by a shoulder on said bolt and the nut thereof which draws the same together and thereby frictionally secures the clamp to the cross-rod. Said rear end of the centering lever 23 is directly pivoted to the bolt 24 between its shoulder and head. As shown, the centering lever 23 comprises two flat bars which directly rest, the one upon the other, at their intermediate portions and are rigidly connected by rivets or otherwise. The forward end of the centering lever 23 is spread to afford a pair of prongs to and between which the rollers 25 are journaled, and the rear end of the said lever is also spread to afford a pair of spring prongs which yieldingly engage the clamp 26 and head of the bolt 27 to prevent rattle between said parts.

When the improved stabilizer is assembled, the centering lever 23 holds the spring 22 in position between the frame side bars 15, with its ends on the frame and bars 16. This spring 22, in turn, holds the frame end bars 16 interlocked with the said frame side bars and said end bars also hold the ends of the frame side bars against lateral separation. The tension of the spring 22 yieldingly holds both of the rollers 25 in contact therewith and the engagement of said rollers with the spring yieldingly hold the lever 23 in a central position with the front wheels 7 set for straight travel. Nevertheless, the machine can be easily steered in the usual way, since, the spring 22 will yield and permit the lever 23 to move either toward the right or the left, as required, to produce the steering action in turning curves or following an irregular road. When the stabilizer is applied, it is not necessary to always hold the steering wheel tightly gripped in the hand, because the stabilizer tends to prevent accidental movement of the steering connections when one of the front wheels strikes a rock, rut, or the like, and even if some such movement should take place, the stabilizer will quickly bring the steering connection back to straight ahead travel of the machine.

The above described invention is comparatively simple to manufacture for the reason that most of the parts are stamped and pressed from sheet metal, and further, the members of the frame side bars 15, the members of the frame end bars 16 and the members of the centering lever 23 are all duplicate parts. Furthermore, the parts of the improved stabilizer may be very quickly assembled, as substantially all of the parts are held together by separable interlocking engagement and, when assembled, may be very quickly and easily applied to an automobile. The several parts of the stabilizer are very strong and durable, but in case one of the parts is broken or worn out, a new one may be substituted therefor.

What I claim is:—

1. A stabilizer for the steering mechanism of automobiles including a frame comprising a pair of side bars and end bars, devices extending through the end bars for securing said frame to a front axle, the ends of the side bars being bent laterally inward for abutting engagement to space said side bars, said end bars having interlocking engagement with the side bars against longitudinal movement thereon and for holding said side bars against lateral separation, a leaf spring extending between the side bars with its ends bearing on the end bars, a centering lever having a head pivoted to the side bars and engaging said spring and normally holding the said lever in a central position, and means for attaching the centering lever to the steering mechanism of an automobile.

2. A stabilizer for the steering mechanism of an automobile including a frame comprising a pair of side bars and end bars, devices extending through the end bars for securing said frame to a front axle, said side bars having U-shaped ends embracing said devices, said end bars having retaining flanges engageable with said U-shaped ends to hold the end bars against longitudinal movement on the side bars, a leaf spring extending between the side bars with its ends bearing on the end bars, a centering lever having a head pivoted to the side bars and engaging said spring and normally holding the said lever in a central position, and means for attaching the centering lever to the steering mechanism of an automobile.

3. A stabilizer for the steering mechanism of automobiles including a frame comprising a pair of side bars and end bars, devices extending through the end bars for securing said frame to a front axle, said side bars having U-shaped ends embracing said devices, said end bars having retaining flanges engageable with said U-shaped ends to hold the end bars against longitudinal movement on the side bars, certain of the arms of said U-shaped ends having abutting engagement to hold the side bars spaced, a leaf spring extending between the side bars with its ends bearing on the end bars, a centering lever having a head pivoted to the side bars and engaging said spring and normally holding the said lever in a central position, and means for attaching the centering lever to the steering mechanism of an automobile.

4. A stabilizer for the steering mechanism of an automobile including a frame comprising a pair of side bars and end bars, devices extending through the end bars for securing said frame to a front axle, said side bars having U-shaped ends embracing said devices, said end bars having retaining flanges engageable with said U-shaped ends to hold the end bars against longitudinal movement on the side bars, certain of said retaining flanges having notches to receive the side bars for holding the same against lateral separation, a leaf spring extending between the side bars with its ends bearing on the end bars, a centering lever having a head pivoted to the side bars and engaging said spring and normally holding the said lever in a central position, and means for attaching the centering lever to the steering mechanism of an automobile.

5. A stabilizer for the steering mechanism of an automobile including a frame comprising a pair of side bars and end bars, devices extending through the end bars for securing said frame to a front axle, said side bars having U-shaped ends embracing said devices, said end bars having retaining flanges engageable with said U-shaped ends to hold the end bars against longitudinal movement on the side bars, certain of the arms of said U-shaped ends having abutting engagement to hold the side bars spaced, certain of said retaining flanges having notches to receive the side bars for holding the same against lateral separation, a leaf spring extending between the side bars with its ends bearing on the end bars, a centering lever having a head pivoted to the side bars and engaging said spring and normally holding the said lever in a central position, and means for attaching the centering lever to the steering mechanism of an automobile.

6. A stabilizer for the steering mechanism of automobiles including a frame comprising a pair of side bars and end bars, devices extending through the end bars for securing said frame to a front axle, said side bars having U-shaped ends embracing said devices and also being laterally inset at said U-shaped ends to afford spring guides, said end bars having retaining flanges engageable with said U-shaped ends to hold the end bars against longitudinal movement on the side bars, a leaf spring between the side bars with its ends bearing on the end bars and held centered by said spring guides, a centering lever having a head pivoted to the side bars and engaging said spring and normally holding the said lever in a central position, and means for attaching the centering lever to the steering mechanism of an automobile.

7. A stabilizer for the steering mechanism of automobiles including a frame comprising a pair of side bars and end bars, devices extending through the end bars for securing said frame to a front axle, said side bars having U-shaped ends embracing said devices, said end bars having retaining flanges engageable with said U-shaped ends to hold the end bars against longitudinal movement on the side bars, a leaf spring extending between the side bars with its ends bearing on the end bars, a centering lever having a head pivoted to the side bars and engaging said spring and normally holding the said lever in a central position, and means for attaching the centering lever to the steering mechanism of an automobile, said centering lever arranged to hold the spring in position on the end bars and said spring, in turn yieldingly hold the end bars in position and interlocked with the side bars.

In testimony whereof I affix my signature.

FRANK C. STOFFER.